United States Patent
Hironaka et al.

(10) Patent No.: US 10,250,322 B2
(45) Date of Patent: Apr. 2, 2019

(54) TRANSMISSION SYSTEM, TRANSMISSION DEVICE, AND TRANSMISSION METHOD

(71) Applicant: FUJITSU LIMITED, Kawasaki-shi, Kanagawa (JP)

(72) Inventors: Shingo Hironaka, Kawasaki (JP); Yuji Kamura, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 3 days.

(21) Appl. No.: 15/426,185

(22) Filed: Feb. 7, 2017

(65) Prior Publication Data
US 2017/0353235 A1 Dec. 7, 2017

(30) Foreign Application Priority Data
Jun. 3, 2016 (JP) .................. 2016-112162

(51) Int. Cl.
*H04B 10/032* (2013.01)
*H04B 10/27* (2013.01)
*H04B 10/038* (2013.01)
*H04B 10/29* (2013.01)
*H04Q 11/00* (2006.01)

(52) U.S. Cl.
CPC ......... *H04B 10/032* (2013.01); *H04B 10/038* (2013.01); *H04B 10/27* (2013.01); *H04B 10/29* (2013.01); *H04Q 11/0005* (2013.01); *H04Q 2011/0043* (2013.01)

(58) Field of Classification Search
CPC .... H04B 10/032; H04B 10/038; H04B 10/27; H04B 10/29; H04Q 11/0005; H04Q 2011/0043
See application file for complete search history.

(56) References Cited

U.S. PATENT DOCUMENTS 7,085,226 B1 * 8/2006 Jung .................... G06F 11/2028
370/219
7,113,699 B1 * 9/2006 Bhate ............... H04B 10/07953
370/222

(Continued)

FOREIGN PATENT DOCUMENTS

JP 2014-093558 5/2014

*Primary Examiner* — Mina M Shalaby
(74) *Attorney, Agent, or Firm* — Fujitsu Patent Center

(57) ABSTRACT

A transmission system includes: a first transmission device that receives a first signal from the work path; a second transmission device, coupled to a protection path in a redundant configuration with respect to the work path, that receives a second signal from the protection path; and a first communication device coupled to the first and second transmission devices, wherein the first communication device, when detecting switching information from the first transmission device, notifies the first transmission device of first switching notification information and notifies the second transmission device of second switching notification information, the first transmission device stops relaying the first signal to the first communication device in response to the first switching notification information from the first communication device, and the second transmission device starts to relay the second signal to the first communication device in response to the second switching notification information from the first communication device.

7 Claims, 9 Drawing Sheets

(56) References Cited

U.S. PATENT DOCUMENTS

| | | | | |
|---|---|---|---|---|
| 7,136,583 B2* | 11/2006 | Oberg | H04B 1/74 | 398/5 |
| 7,289,428 B2* | 10/2007 | Chow | H04J 3/085 | 370/216 |
| 7,570,583 B2* | 8/2009 | Broberg | H04J 3/14 | 370/219 |
| 7,613,391 B2* | 11/2009 | Tajima | G02B 6/3562 | 398/145 |
| 7,663,480 B2* | 2/2010 | Santoro | H04B 10/0773 | 340/3.1 |
| 8,144,576 B2* | 3/2012 | Saltsidis | H04L 41/06 | 370/217 |
| 8,600,228 B2* | 12/2013 | Rafel Porti | H04J 3/14 | 398/1 |
| 8,818,201 B2* | 8/2014 | Healey | H04B 10/032 | 398/1 |
| 8,929,203 B2* | 1/2015 | Ding | H04L 12/462 | 370/217 |
| 9,025,465 B2* | 5/2015 | Cheng | H04L 12/4633 | 370/241 |
| 9,154,220 B2* | 10/2015 | Sugawara | G02B 6/02042 | |
| 9,264,170 B2* | 2/2016 | Namai | H04J 14/0295 | |
| 9,319,758 B2* | 4/2016 | Goswami | H04Q 11/0067 | |
| 9,680,564 B2* | 6/2017 | Wellbrock | H04B 10/032 | |
| 9,705,589 B2* | 7/2017 | Rahn | H04J 3/14 | |
| 2002/0186429 A1* | 12/2002 | Kaspit | H04J 14/0283 | 398/5 |
| 2003/0007211 A1* | 1/2003 | Gummalla | H04J 3/0608 | 398/99 |
| 2008/0281987 A1* | 11/2008 | Skalecki | H04L 12/4658 | 709/253 |
| 2010/0008667 A1* | 1/2010 | Kim | H04Q 11/0067 | 398/58 |
| 2010/0098407 A1* | 4/2010 | Goswami | H04B 10/032 | 398/5 |
| 2010/0247098 A1* | 9/2010 | Nesset | H04L 12/467 | 398/58 |
| 2010/0296808 A1* | 11/2010 | Hinderthur | H04B 10/032 | 398/5 |
| 2011/0026397 A1* | 2/2011 | Saltsidis | H04L 41/0663 | 370/228 |
| 2011/0097077 A1* | 4/2011 | Suzuki | H04B 10/032 | 398/5 |
| 2011/0188849 A1* | 8/2011 | Haramaty | H04B 17/00 | 398/25 |
| 2011/0268435 A1* | 11/2011 | Mizutani | H04L 45/22 | 398/5 |
| 2013/0089316 A1* | 4/2013 | Trojer | H04Q 11/0067 | 398/2 |
| 2013/0163984 A1* | 6/2013 | Kelly | G02B 6/28 | 398/5 |
| 2013/0194911 A1* | 8/2013 | Fedyk | H04L 43/0811 | 370/217 |
| 2013/0259467 A1* | 10/2013 | Kang | H04Q 11/0067 | 398/5 |
| 2014/0072295 A1* | 3/2014 | Wakaki | H04B 10/801 | 398/5 |
| 2014/0119722 A1 | 5/2014 | Ichimura et al. | | |
| 2014/0226987 A1* | 8/2014 | Eiselt | H04J 14/0213 | 398/85 |
| 2014/0269264 A1* | 9/2014 | Sakamoto | H04L 45/28 | 370/228 |
| 2014/0286634 A1* | 9/2014 | Tsuiki | H04B 10/032 | 398/5 |
| 2015/0215032 A1* | 7/2015 | Bevilacqua | H04J 14/0267 | 398/5 |
| 2016/0164596 A1* | 6/2016 | Rao | H04B 10/032 | 398/5 |

\* cited by examiner

TRANSMISSION SYSTEM, TRANSMISSION DEVICE, AND TRANSMISSION METHOD

CROSS-REFERENCE TO RELATED APPLICATION

This application is based upon and claims the benefit of priority of the prior Japanese Patent Application No. 2016-112162, filed on Jun. 3, 2016, the entire contents of which are incorporated herein by reference.

FIELD

The embodiment discussed herein is related to a transmission system, a transmission device, and a transmission method.

BACKGROUND

The International Telecommunication Union Telecommunication Sector (ITU-T) and the Institute of Electrical and Electronic Engineers (IEEE) are promoting the standardization of optical transport network (OTN) technology. According to the OTN standards, different kinds of client signals are transmitted in a transparent manner in an optical network using wavelength division multiplexing technology.

Japanese Laid-open Patent Publication No. 2014-093558 discusses a related art.

SUMMARY

According to an aspect of the embodiments, a transmission system includes: a first transmission device, coupled to a work path, configured to receive a first signal from the work path; a second transmission device, coupled to a protection path in a redundant configuration with respect to the work path, configured to receive a second signal from the protection path; and a first communication device coupled to the first transmission device and second transmission device, wherein the first communication device, when detecting switching information form the first transmission device, notifies the first transmission device of first switching notification information and notifies the second transmission device of second switching notification information, the first transmission device stops relaying the first signal to the first communication device in response to the first switching notification information from the first communication device, and the second transmission device starts to relay the second signal to the first communication device in response to the second switching notification information from the first communication device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
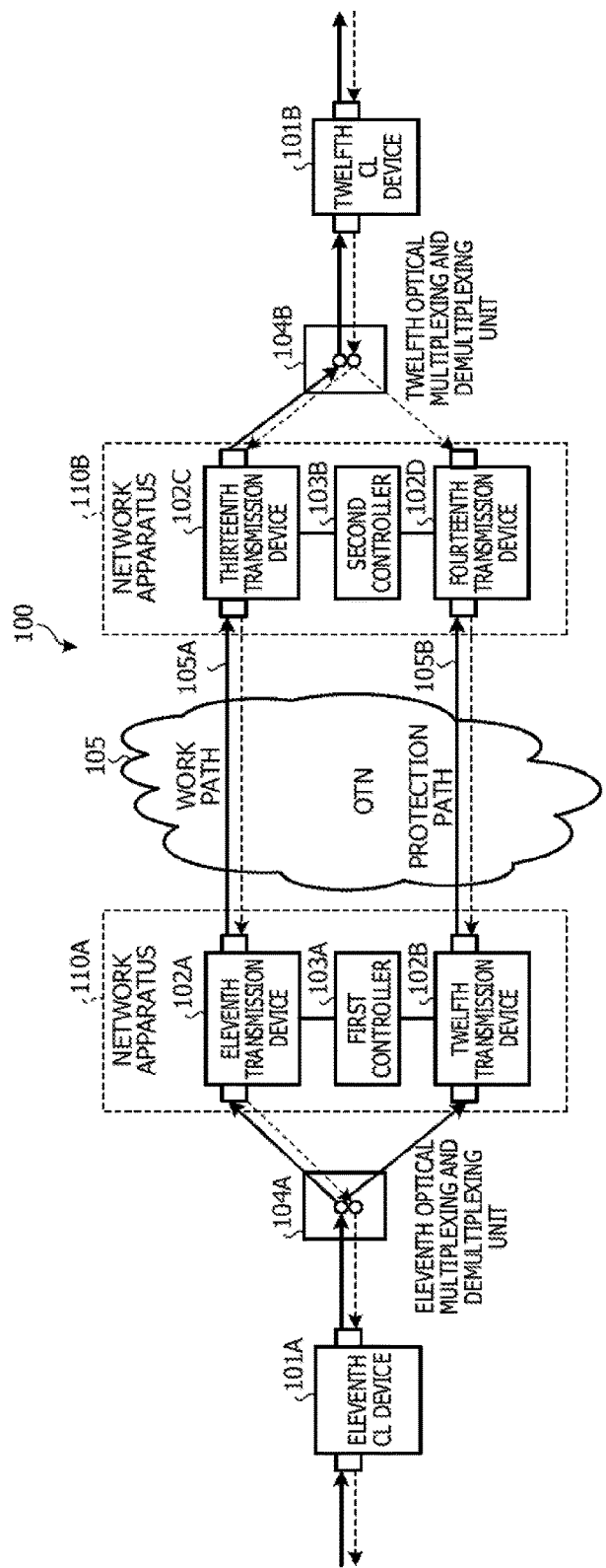
FIG. 1 illustrates an example of a transmission system.

For example, an OTN transmission system includes a protection configuration in which paths are made redundant by using Y cables. FIG. 1 illustrates an example of a transmission system. A transmission system 100 in FIG. 1 includes an eleventh client (CL) device 101A, an eleventh transmission device 102A, a twelfth transmission device 102B, a first controller 103A, and an eleventh optical multiplexing and demultiplexing unit 104A. The transmission system 100 further includes a twelfth CL device 101B, a thirteenth transmission device 102C, a fourteenth transmission device 102D, a second controller 103B, and a twelfth optical multiplexing and demultiplexing unit 104B. The eleventh CL device 101A is connected to the twelfth CL device 101B by paths on an OTN 105, for example, a work path 105A and a protection path 105B in the protection configuration.

The eleventh transmission device 102A, the twelfth transmission device 102B, and the first controller 103A are installed in one network apparatus 110A. The thirteenth transmission device 102C, the fourteenth transmission device 102D, and the second controller 103B are also installed in one network apparatus 110B.

The eleventh transmission device 102A is connected to the thirteenth transmission device 102C by the work path 105A. The twelfth transmission device 102B is connected to the fourteenth transmission device 102D by the protection path 105B. The eleventh optical multiplexing and demultiplexing unit 104A connects the eleventh CL device 101A to the eleventh transmission device 102A and the twelfth transmission device 102B with a Y cable. The eleventh optical multiplexing and demultiplexing unit 104A splits and outputs an optical signal from the eleventh CL device 101A to the eleventh transmission device 102A and the twelfth transmission device 102B. The eleventh optical multiplexing and demultiplexing unit 104A outputs optical signals from the eleventh transmission device 102A and the twelfth transmission device 102B to the eleventh CL device 101A.

The twelfth optical multiplexing and demultiplexing unit 104B connects the twelfth CL device 101B to the thirteenth transmission device 102C and the fourteenth transmission device 102D with a Y cable, and splits and outputs an optical signal from the twelfth CL device 101B to the thirteenth transmission device 102C and the fourteenth transmission device 102D. The twelfth optical multiplexing and demultiplexing unit 104B outputs optical signals from the thirteenth transmission device 102C and the fourteenth transmission device 102D to the twelfth CL device 101B.

The eleventh optical multiplexing and demultiplexing unit 104A splits and outputs an optical signal from the eleventh CL device 101A to the eleventh transmission device 102A and the twelfth transmission device 102B. The eleventh transmission device 102A outputs the optical signal from the eleventh optical multiplexing and demultiplexing unit 104A to the thirteenth transmission device 102C via the work path 105A. The twelfth transmission device 102B also outputs the optical signal from the eleventh optical multiplexing and demultiplexing unit 104A to the fourteenth transmission device 102D via the protection path 105B.

In the thirteenth transmission device 102C, while the work path 105A is used, a laser for relay to the twelfth CL device 1018 is set in an ON state. Thus, the thirteenth transmission device 102C outputs the optical signal received from the eleventh transmission device 102A via the work path 105A to the twelfth optical multiplexing and demultiplexing unit 104B. In the fourteenth transmission device 102D, while the protection path 105B is on standby, a laser for relay to the twelfth CL device 1018 is set in an OFF state. Consequently, the fourteenth transmission device 102D does not output the optical signal received from the twelfth transmission device 102B via the protection path 105B to the twelfth optical multiplexing and demultiplexing unit 104B. The twelfth optical multiplexing and demultiplexing unit 104B outputs the optical signal received through the thirteenth transmission device 102C from the eleventh CL device 101A to the twelfth CL device 1018.

When a failure occurs in the work path 105A, for example, when the thirteenth transmission device 102C detects a path failure in the work path 105A, the thirteenth transmission device 102C notifies the second controller 103B of the path failure. In response to detecting the path failure from the thirteenth transmission device 102C, the second controller 103B causes the thirteenth transmission device 102C to turn off the laser for relay to the twelfth CL device 1018. In response to detecting the path failure from the thirteenth transmission device 102C, the second controller 103B causes the fourteenth transmission device 102D to turn on the laser for relay to the twelfth CL device 1018. For example, when detecting a path failure from the thirteenth transmission device 102C, the second controller 103B switches a transmission path from the work path 105A to the protection path 105B. The fourteenth transmission device 102D outputs the optical signal received from the twelfth transmission device 102B via the protection path 105B to the twelfth optical multiplexing and demultiplexing unit 104B.

When the eleventh transmission device 102A detects a path failure in the work path 105A, the eleventh transmission device 102A notifies the first controller 103A of the path failure. In response to detecting the path failure from the eleventh transmission device 102A, the first controller 103A causes the eleventh transmission device 102A to turn off a laser for relay to the eleventh CL device 101A. In response to detecting the path failure from the eleventh transmission device 102A, the first controller 103A causes the twelfth transmission device 1028 to turn on a laser for relay to the eleventh CL device 101A. For example, when detecting a path failure from the eleventh transmission device 102A, the first controller 103A switches the transmission path from the work path 105A to the protection path 105B. The twelfth transmission device 102B outputs the optical signal received from the fourteenth transmission device 102D via the protection path 105B to the eleventh optical multiplexing and demultiplexing unit 104A.

Consequently, the eleventh CL device 101A switches the transmission path from the work path 105A to the protection path 105B. The twelfth CL device 1016 transmits an optical signal to the eleventh CL device 101A via the twelfth optical multiplexing and demultiplexing unit 104B, the fourteenth transmission device 102D, the protection path 105B, the twelfth transmission device 102B, and the eleventh optical multiplexing and demultiplexing unit 104A in that order.

In the transmission system 100, for example, the eleventh transmission device 102A, the twelfth transmission device 102B, and the first controller 103A are accommodated in the network apparatus 110A. The first controller 103A controls the eleventh transmission device 102A and the twelfth transmission device 102B in a centralized manner. Since the first controller 103A controls the eleventh transmission device 102A and the twelfth transmission device 102B in the network apparatus 110A, fast switching from the work path 105A to the protection path 105B is performed when a failure is detected in the work path 105A.

For example, the transformation of networks into networks based on cloud computing has increased demand for cloud-based products. For example, network apparatuses may employ an open interface (software defined network: SDN) such that distributed network apparatuses are controlled in a centralized manner. For example, a small network apparatus that accommodates no controller 103A (103B) for controlling multiple transmission devices in a centralized manner may become mainstream. In such a small network apparatus, fast switching from a work path to a protection path may fail to be performed within a specified time, because this network apparatus accommodates no controller for controlling transmission devices in a centralized manner, for example, no controller exchanging information with the transmission devices.

For example, a transmission system in which fast switching from a work path to a protection path is performed may be provided.

Figure 2:
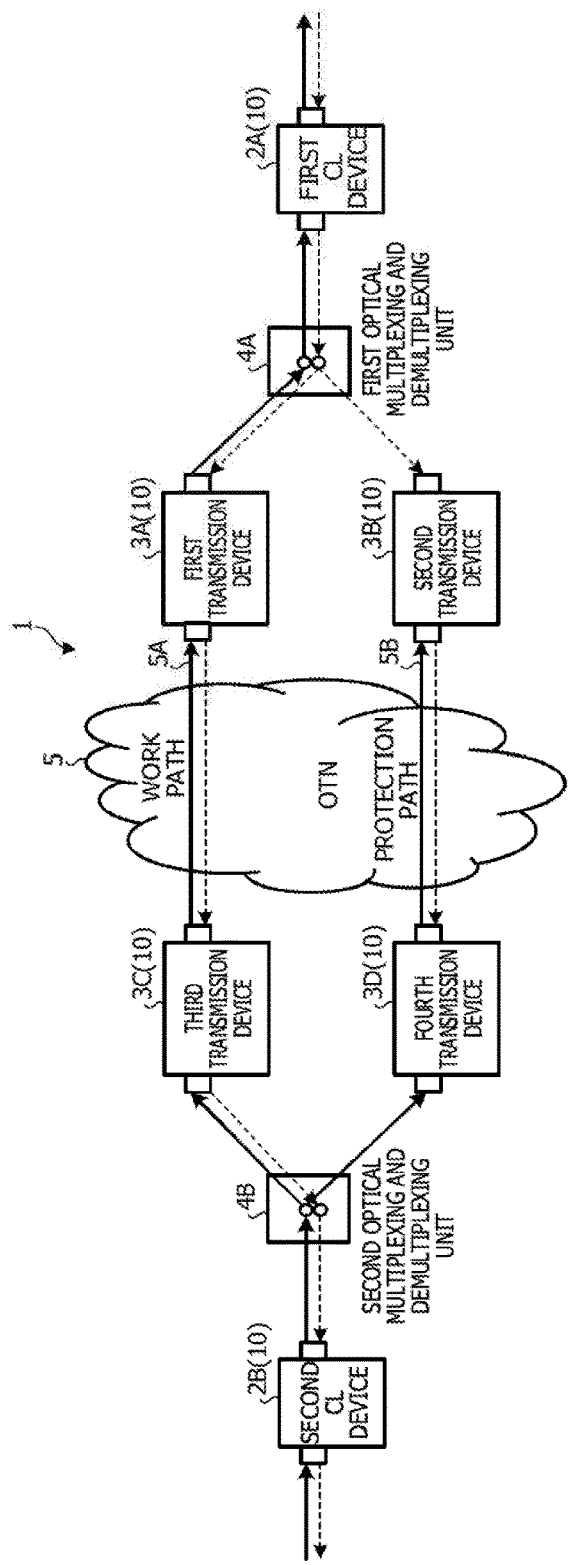
FIG. 2 illustrates an exemplary transmission system.

FIG. 2 illustrates an exemplary transmission system according to an embodiment. A transmission system 1 in FIG. 2 includes a first CL device 2A, a first transmission device 3A, a second transmission device 3B, and a first optical multiplexing and demultiplexing unit 4A. The transmission system 1 further includes a second CL device 2B, a third transmission device 3C, a fourth transmission device 3D, and a second optical multiplexing and demultiplexing unit 4B. The first CL device 2A is connected to the second CL device 2B by paths on an OTN 5, for example, a work path 5A and a protection path 5B in a protection configuration. Each of the first transmission device 3A and the second transmission device 3B may be a small network apparatus that accommodates no controller for controlling the first transmission device 3A and the second transmission device 3B in a common manner. Each of the third transmission device 3C and the fourth transmission device 3D may be a small network apparatus that accommodates no controller for controlling the third transmission device 3C and the fourth transmission device 3D in a common manner.

The first transmission device 3A is connected to the third transmission device 3C by the OTN 5. The second transmission device 3B is connected to the fourth transmission device 3D by the OTN 5. A transmission path between the first transmission device 3A and the third transmission device 3C is set to the work path 5A and a transmission path between the second transmission device 3B and the fourth transmission device 3D is set to the protection path 5B.

The first optical multiplexing and demultiplexing unit 4A connects the first CL device 2A to the first transmission device 3A and the second transmission device 3B with a Y cable, and splits and outputs an optical signal from the first CL device 2A to the first transmission device 3A and the second transmission device 3B. The first optical multiplexing and demultiplexing unit 4A outputs an optical signal from the first transmission device 3A or the second transmission device 3B to the first CL device 2A.

The second optical multiplexing and demultiplexing unit 4B connects the second CL device 2B to the third transmission device 3C and the fourth transmission device 3D with a Y cable, and splits and outputs an optical signal from the second CL device 2B to the third transmission device 3C and the fourth transmission device 3D. The second optical multiplexing and demultiplexing unit 4B outputs an optical signal from the third transmission device 3C or the fourth transmission device 3D to the second CL device 2B.

Figure 3:
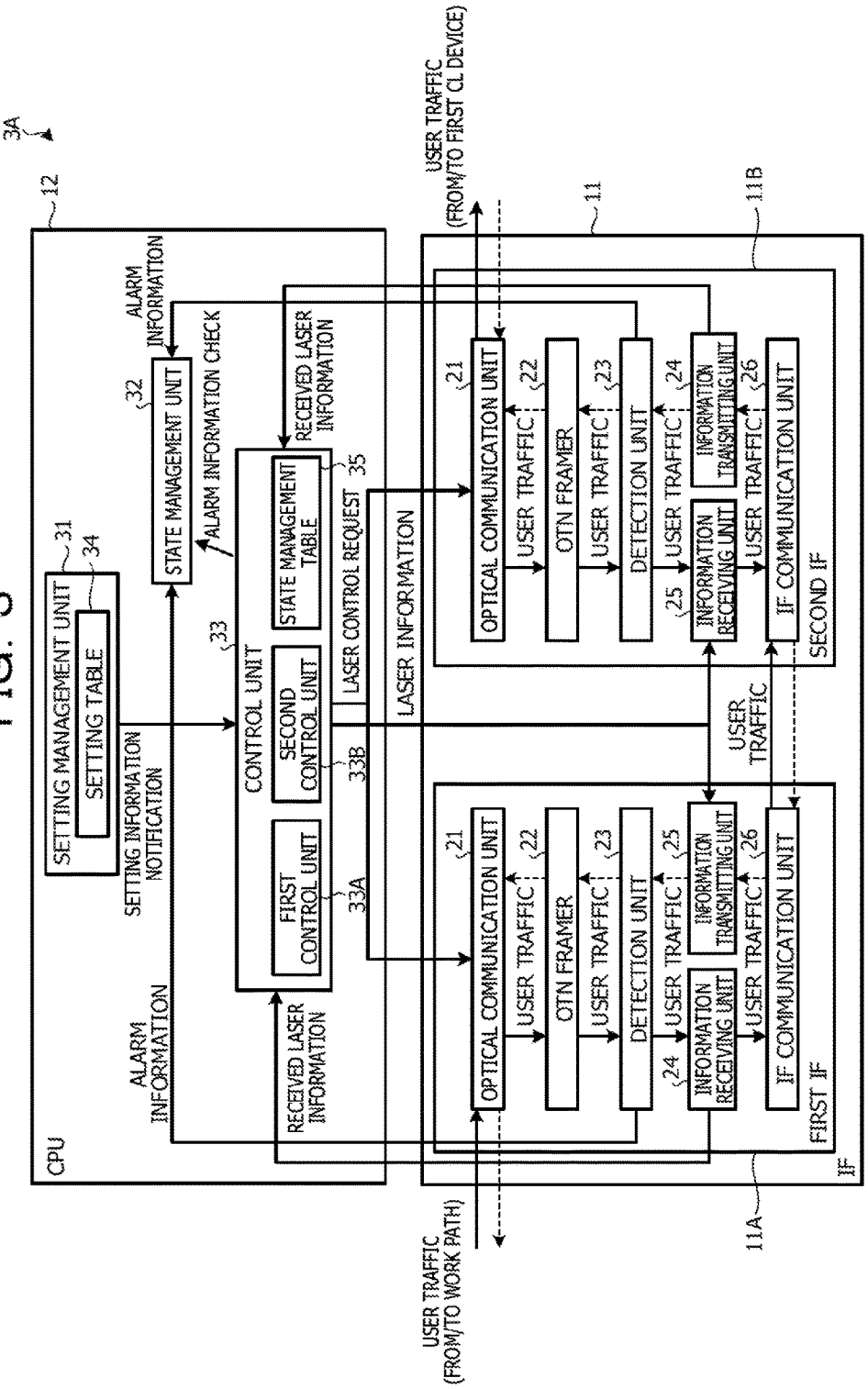
FIG. 3 illustrates an exemplary first transmission device.

The first CL device 2A, the second CL device 2B, the first transmission device 3A, the second transmission device 3B, the third transmission device 3C, and the fourth transmission device 3D may have substantially the same configuration or similar configurations. FIG. 3 illustrates an exemplary first transmission device. For convenience of explanation, the first transmission device 3A in FIG. 2 is illustrated as a transmission device of FIG. 3. Since the first CL device 2A, the second CL device 2B, the second transmission device 3B, the third transmission device 3C, and the fourth transmission device 3D have substantially the same configuration as or a configuration similar to that of the first transmission device 3A, the same components of these devices as those of the first transmission device 3A may be designated by the same reference numerals and redundant description of the components and operations may be omitted.

The first transmission device 3A of FIG. 3 includes an interface (IF) 11 and a CPU 12. The IF 11 includes a first IF 11A for connection to the work path 5A on the OTN 5 and a second IF 11B for connection to the first CL device 2A. The first IF 11A includes an optical communication unit 21, an OTN framer 22, a detection unit 23, an information receiving unit 24, an information transmitting unit 25, and an IF communication unit 26. The optical communication unit 21 may include a laser and a photodiode to transmit and receive optical signals to and from the work path 5A. The optical communication unit 21 includes the photodiode for converting a received optical signal into an electrical signal. The OTN framer 22 executes OTN framing on the electrical signal. The OTN framer 22 decomposes the electrical signal into frames. The detection unit 23 detects alarm information from the electrical signal. The alarm information may be alarm information indicating, for example, occurrence of a path failure. The information receiving unit 24 extracts laser information from the electrical signal. The laser information may be notification information indicating operation states, or laser ON/OFF states for the work path 5A and the protection path 5B. The IF communication unit 26 serves as a communication unit that controls communication with the second IF 11B.

The information transmitting unit 25 adds the laser information to the electrical signal from the IF communication unit 26 and transmits the resultant signal. The OTN framer 22 assembles the electrical signal into an OTN frame and outputs the OTN frame to the optical communication unit 21. The optical communication unit 21, which includes the laser for converting an OTN frame into an optical signal, converts the OTN frame into an optical signal and outputs the optical signal to the work path 5A.

The second IF 11B includes an optical communication unit 21, an OTN framer 22, a detection unit 23, an information receiving unit 24, an information transmitting unit 25, and an IF communication unit 26. The optical communication unit 21 may include a laser and a photodiode to transmit and receive optical signals to and from the first CL device 2A. The first transmission device 3A connects the first IF 11A to the work path 5A and connects the second IF 11B to the first optical multiplexing and demultiplexing unit 4A. When the first transmission device 3A of FIG. 3 is set to the second transmission device 3B, the first IF 11A is connected to the protection path 5B and the second IF 11B is connected to the first optical multiplexing and demultiplexing unit 4A. When the first transmission device 3A of FIG. 3 is set to the third transmission device 3C, the first IF 11A is connected to the work path 5A and the second IF 11B is connected to the second optical multiplexing and demultiplexing unit 4B. When the first transmission device 3A of FIG. 3 is set to the fourth transmission device 3D, the first IF 11A is connected to the protection path 5B and the second IF 11B is connected to the second optical multiplexing and demultiplexing unit 4B.

Figure 4:
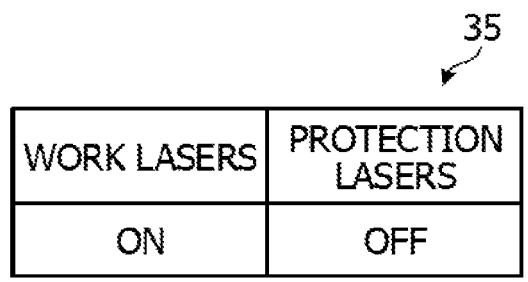
FIG. 4 illustrates an exemplary state management table.

The CPU 12 controls the whole of the first transmission device 3A. The CPU 12 includes a setting management unit 31, a state management unit 32, and a control unit 33. The setting management unit 31 includes a setting table 34. The setting table 34 is a table for managing which of the CL device (for example, the first CL device 2A), the transmission device for the work path 5A (for example, the first transmission device 3A), and the transmission device for the protection path 5B (for example, the second transmission device 3B) is the device including this setting table 34. The control unit 33 includes a state management table 35. The control unit 33 controls the whole of the first transmission device 3A. The state management table 35 is a table for managing laser information indicating ON/OFF states of lasers used to relay signals received from the work path 5A and the protection path 5B to the CL device (for example, the first CL device 2A). FIG. 4 illustrates an exemplary state management table. The state management table 35 of FIG. 4 manages ON/OFF information about work lasers and protection lasers. The work lasers in the optical communication units 21 are lasers used to relay a signal from the work path 5A to the first CL device 2A. The protection lasers in the optical communication units 21 are lasers used to relay a signal from the protection path 5B to the first CL device 2A.

The state management unit 32 manages a current operation state based on alarm information. The control unit 33 controls the work lasers or the protection lasers in the optical communication units 21 based on received laser information.

The control unit 33 of the first CL device 2A includes a first control unit 33A and a second control unit 33B in addition to the state management table 35. For example, when a path switching request (path failure) from the first transmission device 3A is detected, the first control unit 33A notifies the first transmission device 3A of received laser information for controlling driving of the lasers in the optical communication units 21 in the first transmission device 3A. Consequently, the control unit 33 in the first transmission device 3A controls the driving of the lasers in the optical communication units 21 based on the received laser information. When a path switching request (path failure) from the second transmission device 3B is detected, the second control unit 33B notifies the second transmission device 3B of the received laser information for controlling driving of the lasers in the optical communication units 21 in the second transmission device 3B. Consequently, the control unit 33 in the second transmission device 3B controls the driving of the lasers in the optical communication units 21 based on the received laser information.

The control unit 33 of the second CL device 2B also includes the first control unit 33A and the second control unit 33B in addition to the state management table 35. For example, when a path switching request (path failure) from the third transmission device 3C is detected, the first control unit 33A notifies the third transmission device 3C of received laser information for controlling driving of the lasers in the optical communication units 21 of the third transmission device 3C. Consequently, the control unit 33 in the third transmission device 3C controls the driving of the lasers in the optical communication units 21 based on the received laser information. When a path switching request (path failure) from the fourth transmission device 3D is detected, the second control unit 33B notifies the fourth transmission device 3D of the received laser information for controlling driving of the lasers in the optical communication units 21 of the fourth transmission device 3D. Consequently, the control unit 33 in the fourth transmission device 3D controls the driving of the lasers in the optical communication units 21 based on the received laser information.

Figure 5:
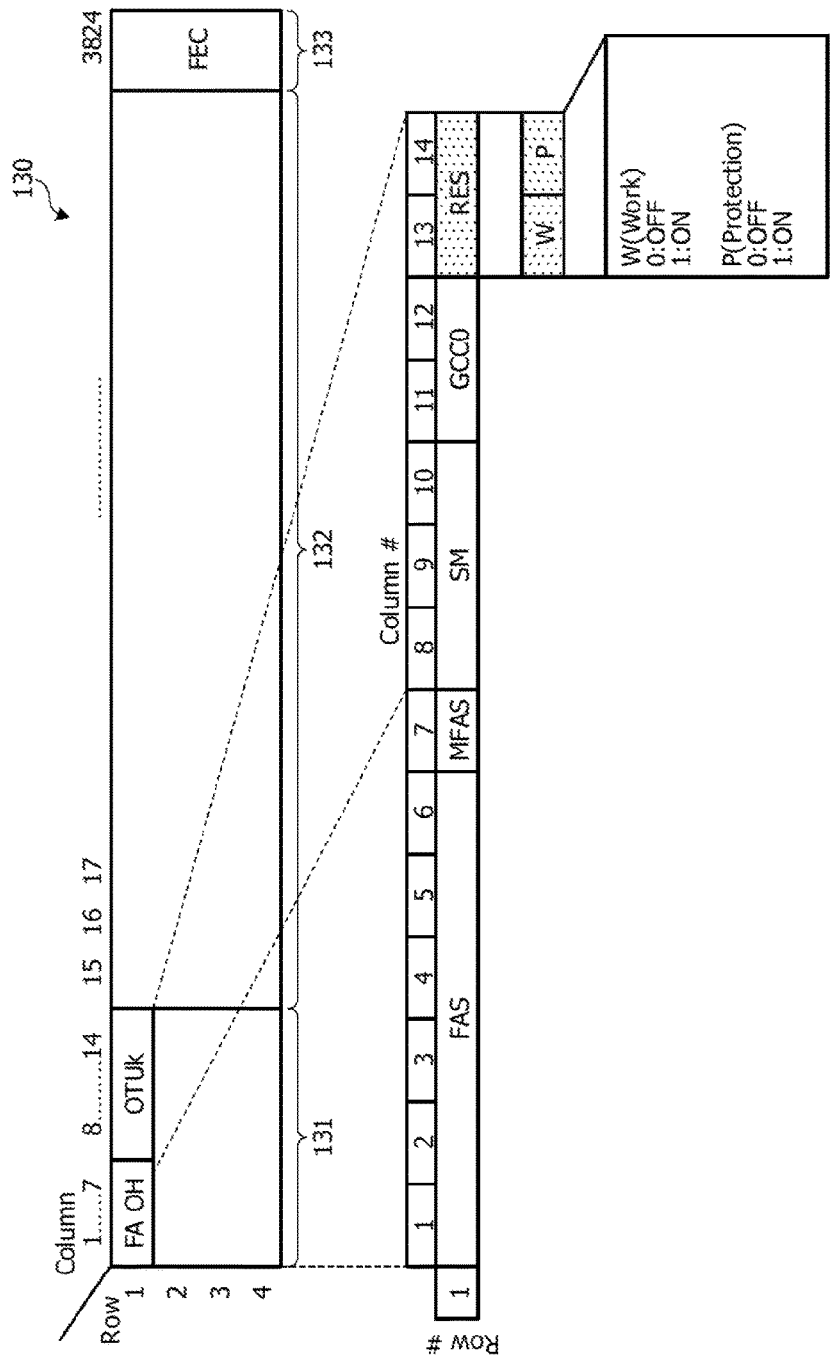
FIG. 5 illustrates an example of a format of an optical channel transport unit (OTU) frame.

FIG. 5 illustrates an example of a format of an OTU frame. An OTU frame 30 includes an overhead (OH) area 131, a payload area 132, and a forward error correction (FEC) area 133. The OH area 131 has a frame size of 16 bytes (Columns 1 to 16)×4 rows. The payload area 132 has a frame size of 3803 bytes (Columns 17 to 3824)×4 rows. The FEC area 133 has a frame size of 256 bytes (Columns 3825 to 4080)×4 rows.

The OH area 131 includes a frame alignment OH located in Row 1 of Columns 1 to 7, an OTU OH located in Row 1 of Columns 8 to 14, an ODU OH located in Rows 2 to 4 of Columns 1 to 14, and an optical channel payload unit (OPU) OH located in Rows 1 to 4 of Columns 15 and 16. The OTU OH is an OTU OH area. The ODU OH is an ODU OH area. The OPU OH is an OPU OH area.

The frame alignment OH includes a frame alignment signal (FAS) and a multi-frame alignment signal (MFAS). The FAS is a frame synchronization signal. The MFAS is a multi-frame synchronization signal for detecting multi-frame synchronization. The OTU OH includes section monitoring (SM), general communication channel (GCC0), and reserved for future international standardization (RES). The SM is information indicating a monitoring state between OTU terminal points. The GCC0 is information for supporting a communication channel between OTU terminal points.

The RES has a two-bit structure. In the two bits, received laser information, for example, the ON/OFF state of the lasers (W) used for the work path 5A and the ON/OFF state of the lasers (P) used for the protection path 5B are set.

The first transmission device 3A permits the work path 5A to be in use and sets the lasers used to relay a signal received from the work path 5A to the first CL device 2A to the ON state. The second transmission device 3B permits the protection path 5B to be on standby and sets the lasers used to relay a signal received from the protection path 5B to the first CL device 2A to the OFF state. The third transmission device 3C permits the work path 5A to be in use and sets the lasers used to relay a signal received from the work path 5A to the second CL device 2B to the ON state. The fourth transmission device 3D permits the protection path 5B to be on standby and sets the lasers used to relay a signal received from the protection path 5B to the second CL device 2B to the OFF state.

For example, in response to detecting a failure in the work path 5A, the first transmission device 3A sets the work path 5A to be on standby and sets the lasers used to relay a signal received from the work path 5A to the first CL device 2A to the OFF state. For example, in response to detecting a failure in the work path 5A, the second transmission device 3B sets the protection path 5B to be in use and sets the lasers used to relay a signal received from the protection path 5B to the first CL device 2A to the ON state. For example, in response to detecting a failure in the work path 5A, the third transmission device 3C sets the work path 5A to be on standby and sets the lasers used to relay a signal received from the work path 5A to the second CL device 2B to the OFF state. For example, in response to detecting a failure in the work path 5A, the fourth transmission device 3D sets the protection path 5B to be in use and sets the lasers used to relay a signal received from the protection path 5B to the second CL device 2B to the ON state.

Figure 6:
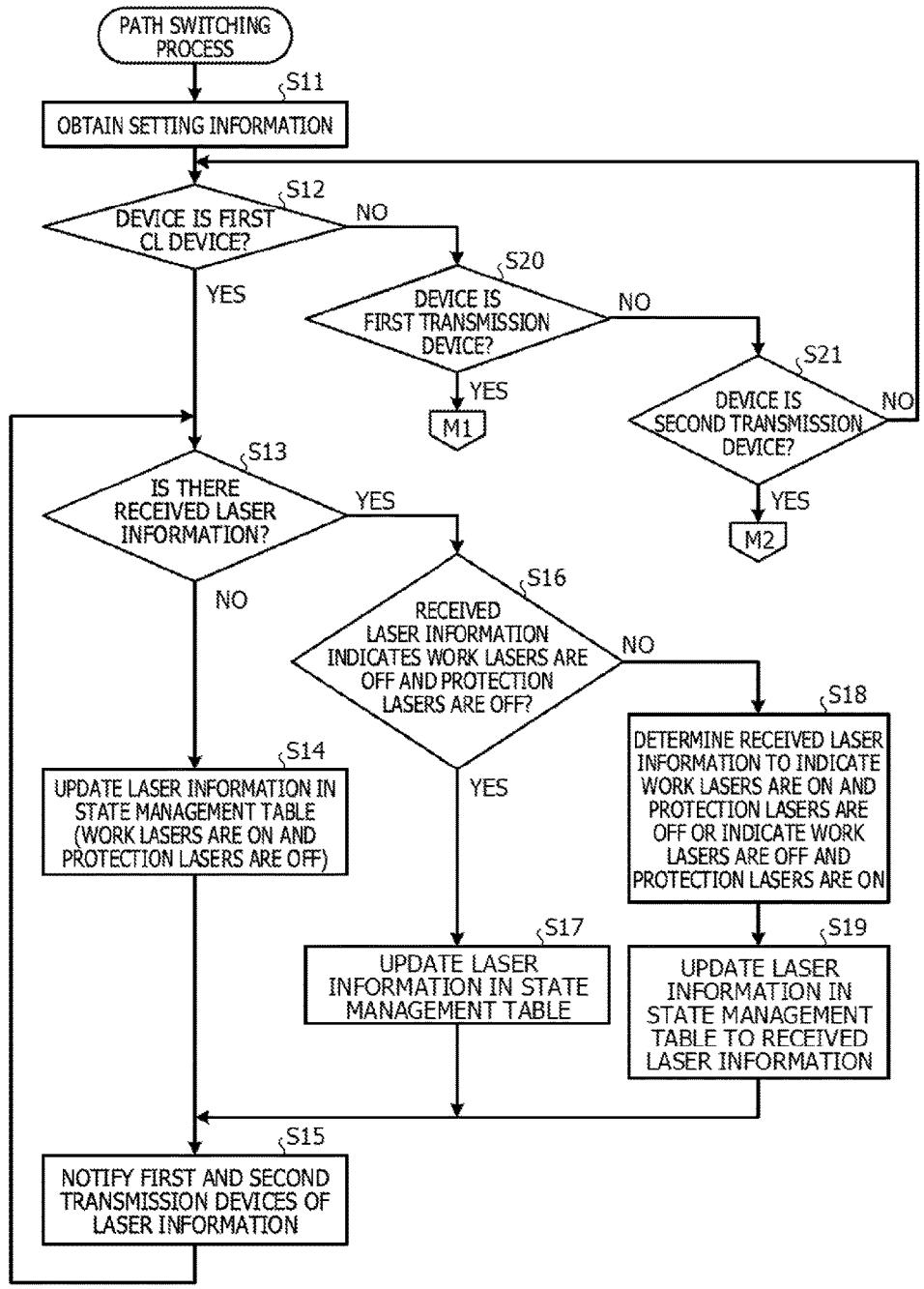
FIG. 6 illustrates an exemplary process of a central processing unit (CPU) in a transmission device involved in a path switching process.

FIG. 6 illustrates an exemplary processing operation of a CPU in a transmission device involved in a path switching process. A transmission device 10 may be any of the first transmission device 3A, the second transmission device 3B, and the first CL device 2A.

In FIG. 6, the setting management unit 31 in the CPU 12 in the transmission device 10 obtains setting information in the setting table 34 (operation S11) and determines based on the setting information whether the device is the first CL device 2A (operation S12). If the device is the first CL device 2A (Yes in operation S12), the control unit 33 in the CPU 12 determines whether there is received laser information (operation S13). The received laser information may be laser information received from another transmission device 10, for example, the first transmission device 3A or the second transmission device 3B.

If there is no received laser information (No in operation S13), the control unit 33 determines that it is in an initial state and updates laser information in the state management table 35 (operation S14). The laser information indicates that the work lasers are ON and the protection lasers are OFF. After updating the laser information, the control unit 33 notifies the transmission device for the work path 5A (the first transmission device 3A) and the transmission device for the protection path 5B (the second transmission device 3B) of the updated laser information (operation S15). The process moves to operation S13 to determine whether there is received laser information.

If there is received laser information (Yes in operation S13), the control unit 33 determines whether the received laser information indicates that the work lasers are OFF and the protection lasers are OFF (operation S16). If the received laser information indicates that the work lasers are OFF and the protection lasers are OFF (Yes in operation S16), the control unit 33 updates the laser information in the state management table 35 (operation S17). The process moves to operation S15, where the control unit 33 notifies the transmission device for the work path 5A (for example, the first transmission device 3A) and the transmission device for the protection path 5B (for example, the second transmission device 3B) of the updated laser information. If the laser information in the state management table 35 indicates that the work lasers are ON and the protection lasers are OFF before updating, the laser information in the state management table 35 is updated to indicate that the work lasers are OFF and the protection lasers are ON. If the laser information in the state management table 35 indicates that the work lasers are OFF and the protection lasers are ON before updating, the laser information in the state management table 35 is updated to indicate that the work lasers are ON and the protection lasers are OFF.

If the received laser information does not indicate that the work lasers are OFF and the protection lasers are OFF (No in operation S16), the control unit 33 determines the received laser information to indicate that the work lasers are ON and the protection lasers are OFF or that the work lasers are OFF and the protection lasers are ON (operation S18), and updates the laser information in the state management table 35 (operation S19). The process moves to operation S15, where the control unit 33 notifies the first transmission device 3A and the second transmission device 3B of the updated laser information. When the received laser information indicates that the work lasers are ON and the protection lasers are OFF, the updated laser information indicates that the work lasers are ON and the protection lasers are OFF. When the received laser information indicates that the work lasers are OFF and the protection lasers are ON, the updated laser information indicates that the work lasers are OFF and the protection lasers are ON.

If the device is not the first CL device 2A (No in operation S12), the setting management unit 31 determines based on the setting information whether the device is the transmission device for the work path 5A (for example, the first transmission device 3A) (operation S20). If the setting management unit 31 determines that the device is the first transmission device 3A (Yes in operation S20), the process proceeds to M1 illustrated in FIG. 7. If the setting management unit 31 determines that the device is not the first transmission device 3A (No in operation S20), the setting management unit 31 determines whether the device is the transmission device for the protection path 5B (for example, the second transmission device 3B) (operation S21).

If the setting management unit 31 determines that the device is not the second transmission device 3B (No in operation S21), the process moves to operation S12, where the setting management unit 31 determines whether the device is the first CL device 2A. If the setting management unit 31 determines that the device is the second transmission device 3B (Yes in operation S21), the process proceeds to M2 illustrated in FIG. 8.

Figure 7:
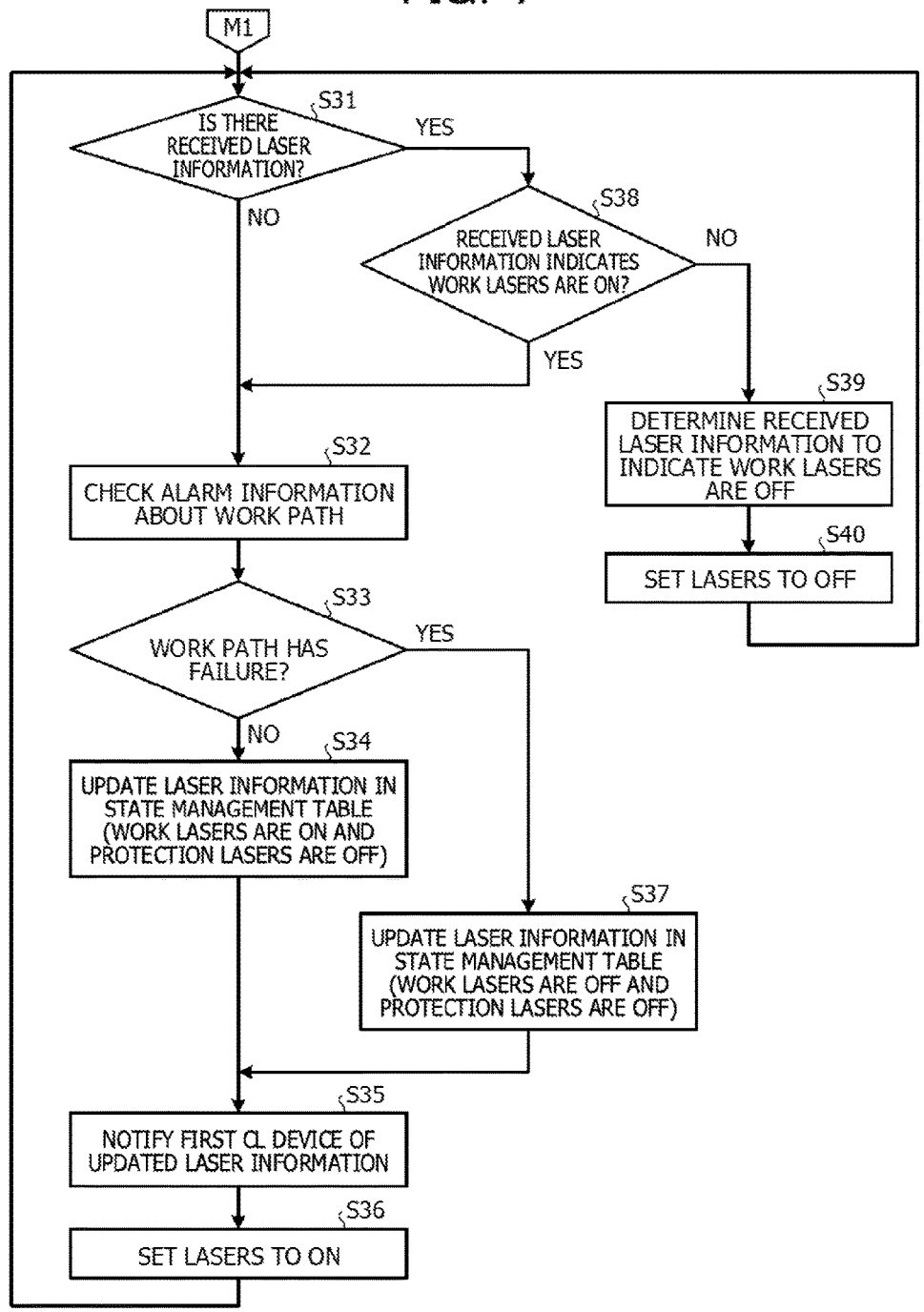
FIG. 7 illustrates an exemplary process of a CPU in another transmission device involved in the path switching process.

In M1 in FIG. 7, that is, if the device is the first transmission device 3A (Yes in operation S20), the control unit 33 determines whether there is received laser information from the first CL device 2A (operation S31). If there is no received laser information (No in operation S31), the state management unit 32 in the CPU 12 checks alarm information about the work path 5A (operation S32), and determines based on the alarm information whether the work path 5A connected to the device has a failure (operation S33).

If the work path 5A has no failure (No in operation S33), the control unit 33 updates laser information in the state management table 35 (operation S34). The laser information indicates that the work lasers are ON and the protection lasers are OFF. After updating the laser information, the control unit 33 notifies the first CL device 2A of the updated laser information (operation S35). The control unit 33 sets the lasers in the optical communication units 21 used to relay a signal received from the work path 5A to the first CL device 2A to the ON state (operation S36). The processing operation in FIG. 7 terminates.

If the state management unit 32 determines based on the alarm information that the work path 5A has a failure (Yes in operation S33), the control unit 33 updates the laser information in the state management table 35 (operation S37). The process moves to operation S35 to notify the second CL device 2B of the updated laser information. The updated laser information indicates that the work lasers are OFF and the protection lasers are OFF.

When determining that there is received laser information (Yes in operation S31), the control unit 33 determines whether the received laser information indicates that the work lasers are ON (operation S38). If the received laser information indicates that the work lasers are ON (Yes in operation S38), the process moves to operation S32, where the state management unit 32 checks alarm information about the work path 5A.

If the received laser information does not indicate that the work lasers are ON (No in operation S38), the control unit 33 determines that the work lasers are OFF (operation S39). The control unit 33 sets the lasers in the optical communication units 21 used to relay a signal received from the work path 5A to the first CL device 2A to the OFF state (operation S40). The process returns to operation S31 to determine whether there is received laser information.

Figure 8:
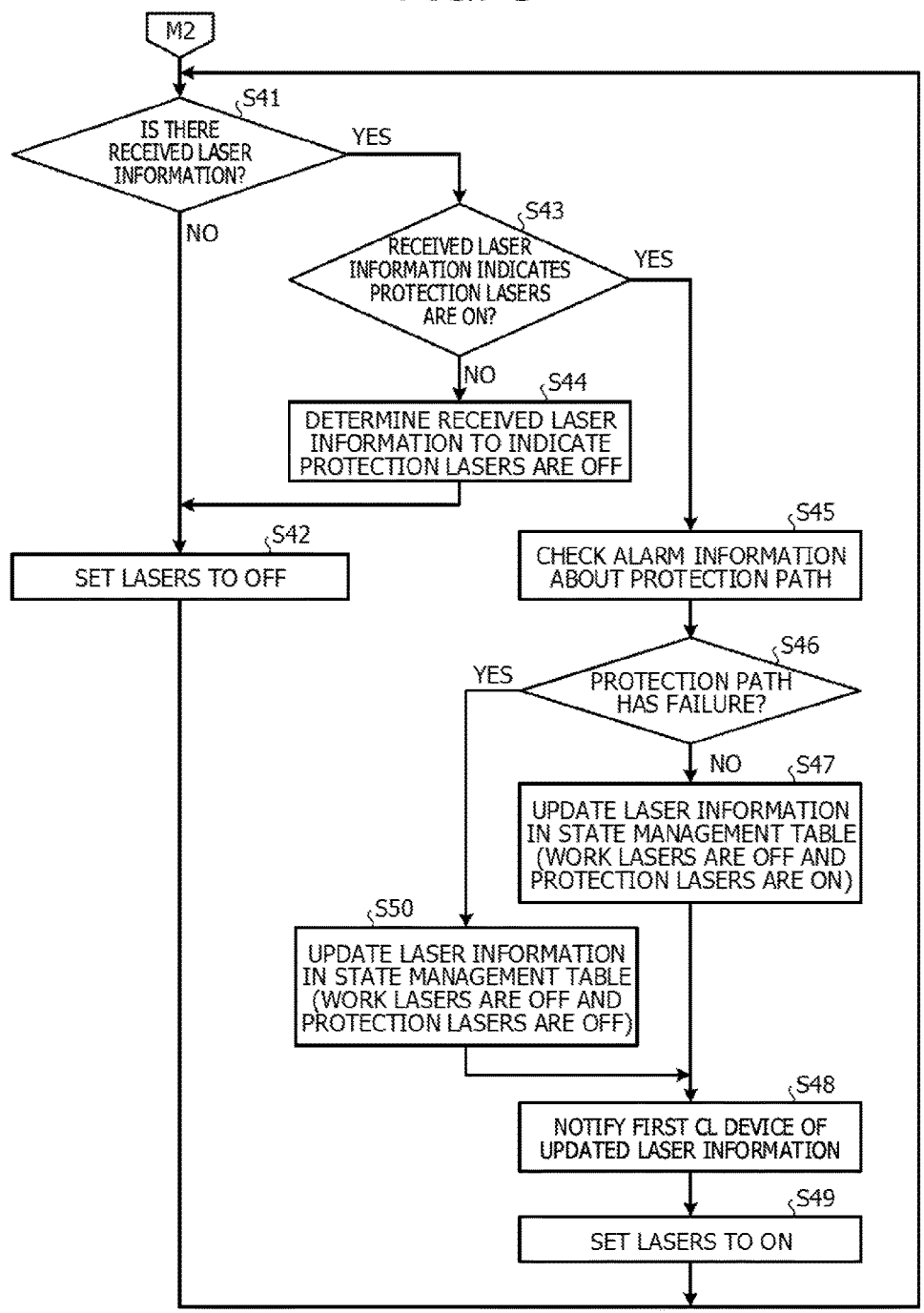
FIG. 8 illustrates an exemplary process of a CPU in another transmission device involved in the path switching process.

In M2 in FIG. 8, that is, if the setting management unit 31 determines that the device is the second transmission device 3B (Yes in operation S21), whether there is received laser information from the first CL device 2A is determined (operation S41). If there is no received laser information (No in operation S41), the control unit 33 sets the lasers in the optical communication units 21 used to relay a signal received from the protection path 5B to the first CL device 2A to the OFF state (operation S42). The process returns to operation S41, where the control unit 33 determines whether there is received laser information.

If there is received laser information (Yes in operation S41), the control unit 33 determines whether the received laser information indicates that the protection lasers are ON (operation S43). If the received laser information does not indicate that the protection lasers are ON (No in operation S43), the control unit 33 determines the received laser information to indicate that the protection lasers are OFF (operation S44). The process moves to operation S42, where the control unit 33 sets the lasers used to relay a signal received from the protection path 5B to the first CL device 2A to the OFF state.

If the received laser information indicates that the protection lasers are ON (Yes in operation S43), the state management unit 32 checks alarm information about the protection path 5B (operation S45) and determines based on the alarm information whether the protection path 5B has a failure (operation S46).

If the protection path 5B has no failure (No in operation S46), the control unit 33 updates laser information in the state management table 35 (operation S47). The laser information is updated to indicate that the work lasers are OFF and the protection lasers are ON. After updating the laser information, the control unit 33 notifies the first CL device 2A of the updated laser information (operation S48). The control unit 33 sets the lasers in the optical communication units 21 used to relay a signal received from the protection path 5B to the first CL device 2A to the ON state (operation S49). The process of FIG. 8 terminates.

If the state management unit 32 determines based on the alarm information that the protection path 5B has a failure (Yes in operation S46), the control unit 33 updates the laser information in the state management table 35 (operation S50). The process moves to operation S48 to notify the first CL device 2A of the updated laser information. The updated laser information indicates that the work lasers are OFF and the protection lasers are OFF.

When received laser information indicates that the work lasers are OFF and the protection lasers are OFF, the first CL device 2A executing the path switching process notifies the first transmission device 3A and the second transmission device 3B of laser information indicating that the work lasers are OFF and the protection lasers are ON. In response to receiving the laser information indicating that the work lasers are OFF from the first CL device 2A, the first transmission device 3A turns off the lasers in the optical communication units 21 used to relay a signal received from the work path 5A to the first CL device 2A. In response to receiving the laser information indicating that the protection lasers are ON from the first CL device 2A, the second transmission device 3B turns on the lasers in the optical communication units 21 used to relay a signal received from the protection path 5B to the first CL device 2A. Consequently, if a small network apparatus includes no controller, fast switching from the work path 5A to the protection path 5B may be performed within a specified time.

When received laser information indicates that the work lasers are OFF and the protection lasers are OFF, the first CL device 2A notifies the first transmission device 3A and the second transmission device 3B of laser information indicating that the work lasers are OFF and the protection lasers are ON. In response to receiving the laser information indicating that the work lasers are OFF from the first CL device 2A, the first transmission device 3A turns off the lasers in the optical communication units 21 used to relay a signal received from the work path 5A to the first CL device 2A. In response to receiving the laser information indicating that the protection lasers are ON from the first CL device 2A, the second transmission device 3B turns on the lasers in the optical communication units 21 used to relay a signal received from the protection path 5B to the first CL device 2A. Consequently, if a small network apparatus includes no controller, for example, no controller exchanging information with the first transmission device 3A and the second transmission device 3B, fast switching from the work path 5A to the protection path 5B may be performed within a specified time.

When received laser information indicates that the work lasers are OFF and the protection lasers are OFF, the second CL device 2B notifies the third transmission device 3C and the fourth transmission device 3D of laser information indicating that the work lasers are OFF and the protection lasers are ON. In response to receiving the laser information indicating that the work lasers are OFF from the second CL device 2B, the third transmission device 3C turns off the lasers in the optical communication units 21 used to relay a signal received from the work path 5A to the first CL device 2A. In response to receiving the laser information indicating that the protection lasers are ON from the second CL device 2B, the fourth transmission device 3D turns on the lasers in the optical communication units 21 used to relay a signal received from the protection path 5B to the first CL device 2A. Consequently, fast switching from the work path 5A to the protection path 5B may be performed within a specified time without any controller exchanging information with the third transmission device 3C and the fourth transmission device 3D.

In the above-described embodiment, when the work path 5A has a failure, the first CL device 2A provides received laser information indicating that the work lasers are OFF and the protection lasers are OFF to the first transmission device 3A and the second transmission device 3B. The timing of providing such information is not limited to an event in which the work path 5A has a failure. The first CL device 2A may provide such information to the first transmission device 3A and the second transmission device 3B to perform normal switching from the work path 5A to the protection path 5B.

In the path switching process depicted in FIGS. 6 to 8, the first CL device 2A is set as a CL device, the first transmission device 3A is set as a transmission device for the work path 5A, and the second transmission device 3B is set as a transmission device for the protection path 5B. For example, the second CL device 2B may be set as a CL device, the third transmission device 3C may be set as a transmission device for the work path 5A, and the fourth transmission device 3D may be set as a transmission device for the protection path 5B.

A removable module, such as a 10 gigabit small form factor pluggable (XFP) module, is compliant with the multiple source agreement (MSA) specifications. For example, it is assumed that an interface #1 and an interface #2 each include a removable module, such as an XFP module, and switching is performed when a failure is detected in the removable module in a work device. Fast switching within 50 ms may fail to be performed because it takes time to detect a failure. For example, it takes up to 200 ms to detect a failure in an XFP module according to the MSA specifications. In contrast, if a failure occurs in a removable module in the above-described first transmission device 3A, fast switching within 50 ms may be performed.

If a failure occurs in a removable module, a signal transmitted from the removable module would become unstable. In the first CL device 2A, since each information receiving unit 24 in the IF 11 does not receive laser information, the control unit 33 is notified of laser information indicating that the work lasers in the first transmission device 3A are OFF and the protection lasers in the second transmission device 3B are OFF. Since the laser information indicates that the work lasers are OFF and the protection lasers are OFF, the control unit 33 notifies the first transmission device 3A and the second transmission device 3B of laser information indicating the work lasers are OFF and the protection lasers are ON. The first transmission device 3A turns off the work lasers based on the received laser information and the second transmission device 3B turns on the protection lasers based on the received laser information, so that the transmission path is switched from the work path 5A to the protection path 5B. Consequently, Y-cable fast switching to the protection path may be performed within a specified time without any controller exchanging information with the first transmission device 3A and the second transmission device 3B.

Figure 9:
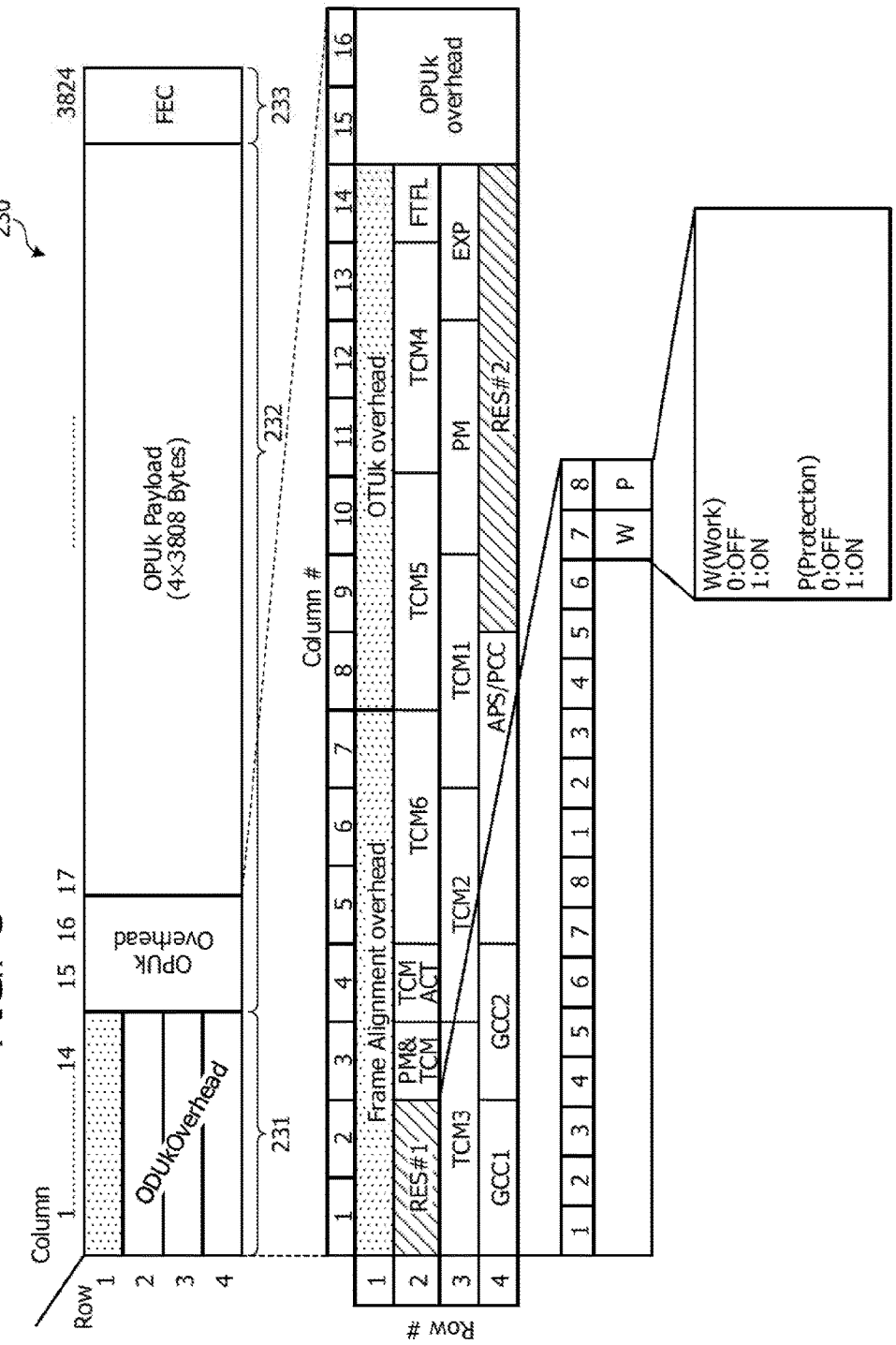
FIG. 9 illustrates an example of a format of an optical channel data unit (ODU) frame.

Although received laser information is added to the RES in the OTU OH of the OTU frame, addition is not limited to this example. Received laser information may be added to RES in the ODU OH. FIG. 9 illustrates an example of a format of an ODU frame. In FIG. 9, substantially the same elements as or elements similar to those in the format of FIG. 5 are designated by the same reference numerals. Redundant description of the elements and operations may be omitted.

Referring to FIG. 9, an OH area 231 includes a frame alignment OH located in Row 1 of Columns 1 to 7, an OTU OH located in Row 1 of Columns 8 to 14, an ODU OH located in Rows 2 to 4 of Columns 1 to 14, and an OPU OH located in Rows 1 to 4 of Columns 15 and 16. The OTU OH is an OTU OH area. The ODU OH is an ODU OH area. The OPU OH is an OPU OH area.

The ODU OH includes two RESs, tandem connection monitoring activation (TCMACT), TCM 1 to TCM 6, fault type and fault location reporting channel (FTFL), path monitoring (PM), and experimental (EXP). The ODU OH includes GCC1 and GCC2 and automatic protection switching and protection communication control channel (APS/PCC). The TCMACT is information for identifying whether tandem connection monitoring is in an active state. The FTFL is information for providing notification of a failure type and a failure position. The PM is information for monitoring a path state. The EXP is information for identifying whether it is for experiment. The APS/PCC is an automatic protection switching and switching communication channel.

In RES#1 corresponding to two bits in a 16-bit configuration, laser information, for example, the ON/OFF state of the lasers used for the work path and the ON/OFF state of the lasers used for the protection path may be set. The laser information may be added to RES#2 instead of the RES#1. A field to which received laser information is added is not limited to the RES. Received laser information may be added to, for example, the GCC0, GCC1, and GCC2.

All or some of the illustrated units may be functionally or physically distributed or integrated in any unit depending on, for example, various loads or use conditions.

All or any one of various processing functions performed by the devices may be implemented on a CPU (or a microcomputer, such as a micro processing unit (MPU) or a micro controller unit (MCU)). All or any one of the various processing functions may be implemented on a program analyzed and executed by a CPU (or a microcomputer, such as an MPU or an MCU) or on wired-logic-based hardware.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A transmission system comprising:
   a first device having a configuration and configured to perform as first one of:
   a first communication device,
   a first transmission device coupled to a work path and including a first interface configured to receive a first signal from the work path, a second interface coupled to the first communication device and a first processor configured to control the first interface and the second interface, and
   a second transmission device coupled to a protection path in a redundant configuration with respect to the work path and including a third interface configured to receive a second signal from the protection path, a fourth interface coupled to the first communication device and a second processor configured to control the third interface and the fourth interface;
   a second device having the same configuration as the first device and configured to perform as second one which is included in the first communication device, the first transmission device and the second transmission device and is different from the first one; and
   a third device having the same configuration as the first device and configured to perform as third one which is included in the first communication device, the first transmission device and the second transmission device and is different from the first one and the second one,
   wherein a third processor provided in the first communication device, when detecting switching information from the first transmission device, notifies the first transmission device of first switching notification information and notifies the second transmission device of second switching notification information,
   the first processor stops relaying the first signal to the first communication device in response to the first switching notification information from the first communication device,
   the second processor starts to relay the second signal to the first communication device in response to the second switching notification information from the first communication device,
   the first device, the second device and the third device include respective setting tables indicating a kind of devices including the first communication device, the first transmission device and the second transmission device, and each processor of the first device, the second device and the third device determines the respective devices perform as which one of the first communication device, the first transmission device and the second transmission device based on the respective setting tables.

2. The system according to claim 1, further comprising:
   a third transmission device coupled to the work path;
   a fourth transmission device coupled to the protection path; and
   a second communication device coupled to the third transmission device and the fourth transmission device and provided on an opposite side of the first communication device,
   wherein a fourth processor provided in the second communication device, when detecting switching information from the third transmission device, notifies the third transmission device of third switching notification information and notifies the fourth transmission device of fourth switching notification information,
   a fifth processor provided in the third transmission device stops relaying a third signal received from the work path to the second communication device in response to the third switching notification information, and
   a sixth processor provided in the fourth transmission device starts to relay a fourth signal received from the protection path to the second communication device in response to the fourth switching notification information.

3. The system according to claim 1, wherein the first processor turns off a first laser that outputs an optical signal to the first communication device to stop the relay to the first communication device.

4. The system according to claim 1, wherein the second processor turns on a second laser that outputs an optical signal to the first communication device to start the relay to the first communication device.

5. A transmission method comprising:
   determining, by a first device of at least three devices having the same configuration, whether the first device corresponds to which one of a communication device, a first transmission device, which is coupled to a work path and includes a first interface configured to receive a first signal from the work path, a second interface coupled to the communication device and a first processor configured to control the first interface and the second interface, and a second transmission device, which is coupled to a protection path in a redundant configuration with respect to the work path and includes a third interface configured to receive a second signal from the protection path, a fourth interface coupled to the communication device and a second processor configured to control the third interface and the fourth interface, by using a first setting table of the first device indicating a kind of devices including the communication device, the first transmission device and the second transmission device;

determining, by a second device of the at least three devices, whether the second device corresponds to which one of the communication device, the first transmission device and the second transmission device by using a second setting table of the second device indicating a kind of devices including the communication device, the first transmission device and the second transmission device, the one being different from the one corresponding to the first device;

determining, by a third device of the at least three devices, whether the third device corresponds to which one of the communication device, the first transmission device and the second transmission device by using a third setting table of the third device indicating a kind of devices including the communication device, the first transmission device and the second transmission device, the one being different from the one corresponding to the first device and the one corresponding to the second device;

receiving, by the communication device, switching information from the first transmission device;

notifying the first transmission device of first switching notification information based on the switching information;

notifying the second transmission device of second switching notification information based on the switching information;

stopping, by the first transmission device, relaying the first signal to the communication device in response to the first switching notification information; and starting, by the second transmission device, relaying the second signal to the communication device in response to the second switching notification information, and the communication device, the first transmission device and the second transmission device have the same configuration.

6. The transmission method according to claim 5, wherein the first transmission device turns off a first laser that outputs an optical signal to the communication device to stop the relay to the communication device.

7. The transmission method according to claim 5, wherein the second transmission device turns on a second laser that outputs an optical signal to the communication device to start the relay to the communication device.

* * * * *